United States Patent [19]
Puckette et al.

[11] 3,787,852
[45] Jan. 22, 1974

[54] BUCKET BRIGATE DELAY LINE TIME MULTIPLEXED MTI CIRCUIT FOR RADAR

[75] Inventors: Charles M. Puckette, Scotia; Donald A. Smith, Schenectady; Walter J. Butler, Scotia, all of N.Y.

[73] Assignee: General Electric Company, Schenectady, N.Y.

[22] Filed: Apr. 3, 1972

[21] Appl. No.: 240,441

[52] U.S. Cl. .................................. 343/7.7
[51] Int. Cl. ................................ G01s 9/42
[58] Field of Search ...................... 343/7.7

[56] References Cited
UNITED STATES PATENTS
3,611,375  10/1971  Chambers et al.............. 343/7.7

Primary Examiner—T. H. Tubbesing
Attorney, Agent, or Firm—John F. Ahern et al.

[57] ABSTRACT

A plurality of bucket brigade delay line circuits are interposed in parallel in a radar receiver signal path. Sequential portions of the received signal are clocked into the bucket brigade delay line circuits serially, so that each radar pulse repetition period is divided into a plurality of subperiods and one such subperiod is stored in each bucket brigade delay line circuit. MTI effect is provided by combining the output of each bucket brigade delay line circuit with the signal in a corresponding subperiod of a preceding or following radar pulse repetition period.

10 Claims, 6 Drawing Figures

3,787,852

BUCKET BRIGATE DELAY LINE TIME MULTIPLEXED MTI CIRCUIT FOR RADAR

This invention relates to radar. More particularly, this invention relates to radar moving target indicator (MTI) circuits of the delay line and canceler type, in which the delay line comprises an analog charge transfer device of the general sort commonly known as bucket brigade delay lines.

As used herein, "MTI radar" refers to radar having MTI capability; "radar MTI" refers to the circuit providing such capability.

Radar moving target indicators currently employ either coherent phase detection or delay lines and comparators to extract Dopler information from the signals returned from moving targets. The coherent phase detection technique is not related to the instant invention and will not be further discussed here. In the delay line technique, each radar return is split into two signal channels. One such channel is delayed with respect to the other channel for a period equal to the pulse repetition interval of the radar. The outputs of the two channels are then combined in a subtractor circuit whose output therefore contains only information which has changed from one radar pulse to the next. Typical radars will require MTI delay lines whose delay period is longer than that which can be practically provided by electromagnetic delay lines. For example, a search radar employing a 360 pulse per second prf requires an MTI delay of nearly 3 milliseconds. Current MTI radars, therefore, employ acoustical delay lines. The radar signal to be delayed is delivered to a first transducer which converts it into mechanical energy and applies the mechanical energy to a first end of a delay medium mass. The mechanical energy propagates in an acoustic mode through the delay medium mass to a second end thereof where it is reconverted by a second transducer into electromagnetic signal energy. Currently employed delay media include liquid mercury and fused quartz. Such acoustical delay lines are capable of providing the long delay needed in radar MTI applications, and, because of the inherently low Q of the delay media employed, provide an adquate bandwidth for radar signal information. There are, however, several disadvantages inherent in the use of acoustic delay lines. These include the high insertion loss (as much as 75 dB) of acoustic delay lines, and their large weight and bulk. Additionally, acoustic delay lines produce spurious output signals as a result of secondary reflections of acoustic energy therein. For a fused quartz delay line, for example, such spurious output signals may be within 40 dB of the amplitude of the desired signal. The disadvantage of large size and weight is particularly serious in airborne applications; the disadvantages of high insertion loss and secondary reflection spurious signal production are troublesome in all applications.

One disadvantage which is common to any delay line type MTI is the existence of "blind speeds." The radar return signal of any moving target whose speed is such that its Dopler frequency shift is equal to the radar pulse repetition frequency, or a multiple thereof, will be canceled in the subtraction circuit; thus a family of speeds to which the MTI radar is "blind" exists. While in theory blind speeds could be placed beyond the range of expected target velocities by employing very low radar carrier frequencies or very high radar pulse repetition frequencies, these solutions are not particularly convenient in practice. The use of very low radar carrier frequencies would make a well-defined radar beam impossible to obtain with antennas of convenient size; the use of very high pulse repetition frequencies would result in overly short maximum unambiguous ranges for most applications. There-fore for practicable radars, at least some blind speeds will occur within the range of expected target velocities. Accordingly, in practical radars the blind speed problem is usually dealt with by the use of multiple or staggered pulse repetition frequencies. By this technique a radar may be made to exhibit two families of blind speeds having no members in common. Any given target, therefore, has a very high probability of being detected at one or the other or both repetition frequencies. Because the delay of an acoustic delay line is a function of the dimension of the delay medium in the direction of energy propagation, the use of multiple or staggered prf's to reduce the blind speed problem in MTI radars using acoustic delay lines requires that a second delay line and means for commutating the received radar signal between the two delay lines be employed. This results in a substantial increase in system bulk, weight, and cost.

As has been discussed, electromagnetic delay lines comprising lumped or distributed inductance and capacitance cannot provide the delay times and bandwidths required for radar MTI use. Another possibility is the use of a digitally controlled analog charge transfer delay line, which may be thought of as a shift register for analog signals. In principle, such a register is quite simple. Sampled values of the analog signal are stored in the form of charges on a series of capacitors. Between each of these storage capacitors is a switch for transferring the charges from one capacitor to the next, under control of "clock" pulses applied to the switch. A "clock" is a circuit for generating a time base signal to which other circuits are synchronized. A circuit or signal so synchronized is said to be "clocked." It may be seen that a plurality of such capacitor and switch circuits connected electrically in series may be used to delay an analog signal. The time delay would be simply a function of the number of such circuits connected in series and the clock frequency used to cause the switches to transfer charge from one capacitor to the next, subject to the limitation that the clock frequency be equal to or greater than two times the bandwidth of the signal energy being delayed when a single serial delay line is used. Parallel delay lines configured in so called "push-pull" will permit a signal bandwidth equal to the clock frequency. In practice, however, such analog charge transfer delay lines have not been used until quite recently because of the impractical complexity of the switches required to ensure a correct and complete transfer of sampled signal charge from one capacitor to the next. Recently, however, analog charge transfer devices have been constructed which are characterized by a charge flow direction opposite to the signal propagation direction through the device. One form of such analog charge transfer device is known as a "bucket brigade delay line" and is described, for example, by F.L.J. Sangster in 31 Philips Technical Review, No. 4 at pages 97–110. In such bucket brigade delay lines, the storage capacitors are referenced not to ground but rather to some arbitrary potential with respect to ground. The only constraints upon the reference voltage are that it may not be so large as to cause the breakdown of the circuit elements, and it must be greater than the largest signal voltage to be applied to the delay line. In operation, the first sample of signal voltage is applied to the delay line and the first capacitor is discharged to a point corresponding to the amplitude of the signal sample. On the following clock pulse the second capacitor is discharged into the first capacitor until the first capacitor has been returned to the reference value of charge. The second capacitor therefore has the same charge value as the first capacitor had. Similarly, each successive capacitor is discharged into the preceding capacitor upon successive clock pulses. By means of this technique of signal propagation by means of charge deficit transfer, a delay line may be constructed using very simple and inexpensive switch configurations. For example, integrated circuit bucket brigade delay lines have been constructed in which each switch is simply a bi-polar or field effect transistor.

The use of a bucket brigade delay line in radar MTI circuits would appear to offer advantages over the use of acoustic delay lines. An integrated circuit bucket brigade delay line is smaller and lighter than a corresponding acoustic delay line. Furthermore, since the delay through a bucket brigade delay line is a function of the clock frequency, and the clock frequency may be determined as a function of the radar *prf*, a single bucket brigade delay line could be employed in radars using staggered or multiple *prf's* for reducing the blind speeds problem. This results in further size, weight, and cost advantages over the use of acoustic delay lines which requires that multiple delay lines be employed whenever multiple *prf's* are being employed.

Nevertheless, bucket brigade delay lines have not been used in radar MTI circuits. This is because the time delay and bandwidth requirements for MTI delay lines are such that a bucket brigade delay line for MTI use would exhibit a totally unacceptable degree of signal attenuation. Delay time of a bucket brigade delay line can be increased only by decreasing the clock frequency or increasing the number of bucket brigade stages. Since in order to fully characterize the radar signal in a single serial delay line, the clock frequency must be equal to at least two times the radar signal bandwidth, it may be seen that a very large number of bucket brigade stages would be required to provide the hundreds of microsecond or millisecond delays which practical radar MTI's require. While an individual bucket brigade stage is a fairly low loss device, the serial interconnection of the number of stages which would be required for an MTI delay line, results in a total attenuation equal to the sum of the attenuations in each stage and amounts to a totally unacceptable level of attenuation.

Accordingly, it is an object of this invention to provide a practical radar MTI delay line comprising an analog charge transfer delay line.

It is another object of this invention to provide such a delay line which is small in volume and light in weight.

Another object of this invention is to provide such a delay line which offers low insertion loss for the radar signal being processed.

Another object is to provide such a delay line which does not produce spurious signals.

It is another object to provide for radar MTI circuitry in which a single delay circuit may, without modification, be operated in radars having multiple *prf's* and in different radars.

Yet another object is to provide radar MTI circuitry which is simple and inexpensive to manufacture and adaptable to fabrication by integrated circuit techniques.

Briefly, in accordance with one embodiment of this invention, radar video signal is provided in parallel to a comparator circuit and at least one charge transfer delay line circuit. Clock energy is commutated among the charge transfer delay lines so that each delay line stores a portion of the video signal. The output of the charge transfer delay lines is compared with the video signal in the comparator circuit.

Figure 1:
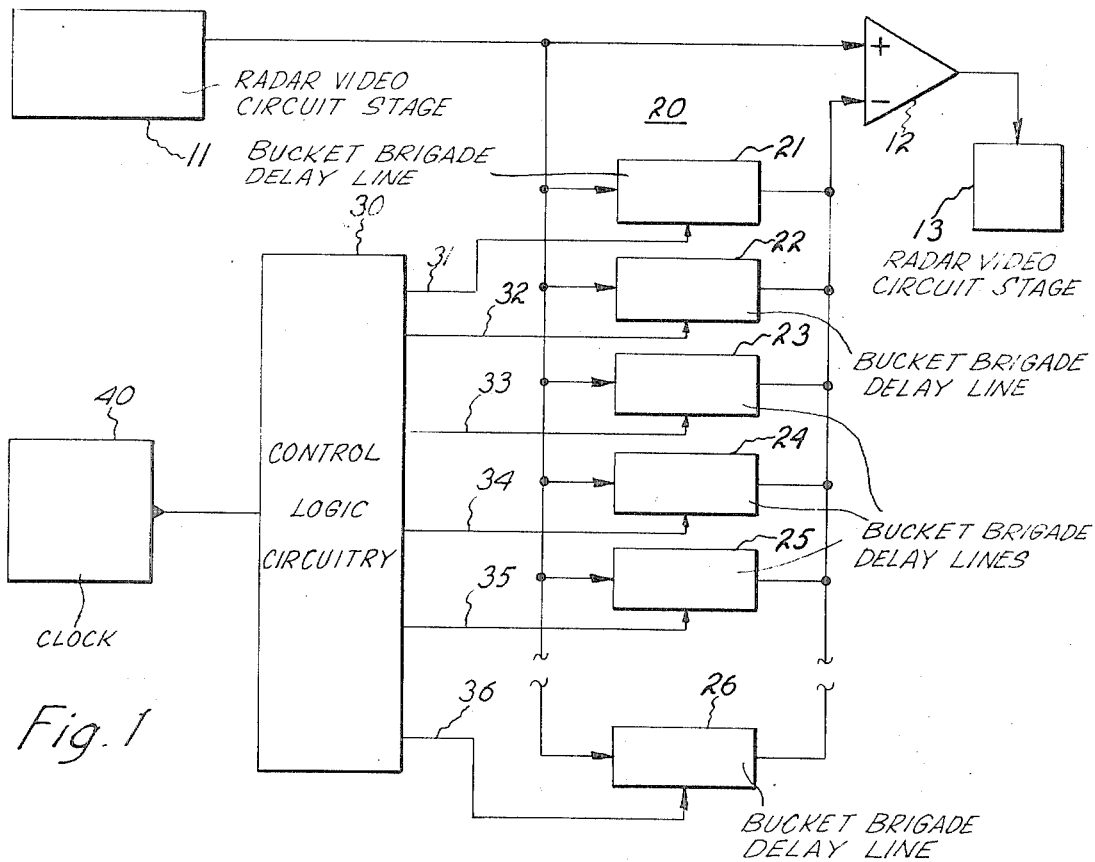
FIG. 1 is a block diagram of a radar MTI circuit in accordance with this invention in which signal energy delayed in charge transfer delay line circuits for one radar pulse repetition period is compared with undelayed radar signal energy.

In a first embodiment, this invention provides a radar MTI circuit in which radar signal energy is provided in parallel to the signal input terminals of a plurality of analog charge transfer delay lines. The control input terminals of each of these delay lines, which may be bucket brigade delay lines, is connected through control logic circuitry to a single master clock. The control logic circuitry causes the master clock output to be applied to each of the bucket brigade delay lines serially in time. Thus, during a first subperiod of the radar pulse repetition period, the control logic circuitry causes the master clock output to be applied to the first of the bucket brigade delay lines, and the radar information present in the first subperiod is stored in the first bucket brigade delay line. At the beginning of a second subperiod of the radar pulse repetition period, the control logic circuitry causes the master clock output to be removed from the control inputs of the first bucket brigade delay line and to be applied to the control input terminals of a second brigade delay line. At this point, the radar information present in the first subperiod is statically stored in the first bucket brigade delay line and the radar information present in the second subperiod of the radar pulse repetition period is clocked into the second bucket brigade delay line. Similarly, the radar information contained in each radar subperiod is clocked into one bucket brigade delay line where it is statically stored until the corresponding subperiod of the following radar pulse repetition period. The process is repeated in the following radar pulse repetition period in which, simultaneously with the storage of radar information contained in each subperiod in its corresponding bucket brigade delay line, the information stored in each bucket brigade delay line during the previous radar pulse repetition period is delivered from each clocked bucket brigade delay line to a subtractor circuit where it is combined with undelayed radar signal data contained in the corresponding subperiod of the following radar pulse repetition period. Thus, subperiod by subperiod, radar signal data is delayed precisely one radar pulse repeitiotn period and is then combined in a subtractor circuit with undelayed radar signal data and the MTI function is performed.

In another embodiment of this invention, the radar signal is delivered in parallel to a plurality of bucket brigade delay lines, each of which is connected in series with another bucket brigade delay line to form a plurality of pairs of bucket brigade delay lines. The delay lines of each pair of delay lines are clocked simultaneously for one subperiod of the radar pulse repetition period and the inputs to the subtractor circuit are taken from the output of the first and the output of the second bucket brigade delay lines of each bucket brigade delay line pair. This results in the comparison in the subtractor circuit of radar signal data which has been delayed for two radar pulse repetition periods with radar signal data which has been delayed for one radar pulse repetition period. Since comparison is between adjacent radar pulse repetition periods, the normal MTI function is performed and is merely delayed by one radar pulse repetition period, which is operationally immaterial. Since the essential nature of a bucket brigade delay line involves the sampling of signal data, this alternative embodiment has the advantage of providing for the comparison, in the subtractor circuit, of sampled data with sampled data, as opposed to the comparison of sampled data with unsampled data in the first embodiment. In applications in which very weak radar returns are expected, the second embodiment is preferable. When it is anticipated that only relatively strong radar returns will be of interest, the first embodiment is preferable because of the decrease in cost and increase in reliability which inheres in having fewer circuit components.

In FIG. 1, a first radar receiver video stage 11 provides a received video signal in parallel to a plurality of charge transfer delay line circuits, indicated generally at 20, and to a first input of substractor circuit 12. Charge transfer delay line circuits 20 store radar signal information only when clocked. Therefore, while radar information is supplied to each of the delay line circuits simultaneously in parallel, only those circuits which are clocked are effective in storing data. Delay lines 21–26 are shown in the drawing for purposes of illustration. The break shown in FIG. 1 is indicative of the fact that a typical radar MTI circuit will contain a number of additional delay line circuits not shown. Delay line circuits 21–25 inclusive represent the first five delay line circuits of the MTI circuits, and delay line 26 represents the last, or Nth, delay line of the MTI circuit having N delay lines. The radar pulse repetition period, of duration T, is divided into N subperiods of duration $\tau$, and one such subperiod is stored in each delay line circuit 21–26. In the first subperiod the output of clock 40 is connected by control logic, indicated generally at 30, to control line 31, which applies the clock output to charge transfer delay line 21, and radar information is clocked into and stored in delay line 21. At the conclusion of the first subperiod, control logic circuitry 30 removes the clock signal from line 31 and applies it to line 32. Radar signal information is therefore clocked into and stored in charge transfer delay line 22 during the second subperiod. The radar information which was clocked into charge transfer delay line 21 during the first subperiod is not propagating through charge transfer delay line 21 because of the absence of clock signal from line 31 and is therefore statically stored in delay line 21. Similarly, at the conclusion of the second subperiod, control logic circuitry 30 causes the output of clock 40 to be removed from line 32 and applied to line 33. At this point, radar information contained in the second subperiod is statically stored in charge transfer delay line 22 and radar information in the third subperiod is clocked into charge transfer delay line 23.

Each of charge transfer delay lines 20 is K stages in length and control logic circuitry 30 applies K clock pulses to one of clock lines 31 through 36 in each $\tau$ interval subperiod. Thus, during the first radar pulse repetition period T, no output is provided by any of charge transfer delay lines 21–26, and at the concusion of the first radar pulse repetition period, all rqdar signal information contained therein is stored statically in the charge transfer delay lines. At the start of the second radar pulse repetition period, control logic circuitry 30 again provides clock pulses to line 31 and radar signal information contained in the first subperiod of the second pulse repetition period is clocked into charge transfer delay line 21. Simultaneously, information which was stored in charge transfer delay line 21 during the first radar pulse repetition period is clocked out of charge transfer delay line 21 and is delivered to a second input terminal of subtractor circuit 12. At this point, subtractor circuit 12 provides an output to a second radar video circuit stage 13 which is proportional to the difference between the output of radar video stage 11 and the output of charge transfer delay line circuit 21. Expressed functionally, the output of subtractor circuit 12 is proportional to the difference between the radar video signal in the first subperiod of the second radar pulse repetition period and the radar video signal in the first subperiod of the first radar pulse repetition period. At the conclusion of the first subperiod of the second radar pulse repetition period, control logic circuitry 30 removes the clock output from line 31 and applies it to line 32. At this point, radar signal information contained in the first subperiod of the second radar pulse repetition period is statically stored in charge transfer delay line 21 and radar signal information in the second subperiod of the second radar pulse repetition period is clocked into charge transfer delay line circuit 22 while information from the second subperiod of the first radar pulse repetition period is clocked out of charge transfer delay line 22 and is delivered to the second input terminal of subtractor circuit 12. The process just described continues seriatim through each of the following subperiods and is repeated from radar pulse repetition period to radar pulse repetition period for following radar pulse repetition periods. Functionally therefore the inventive circuitry provides for the delay of radar signal information by one pulse repetition period and the combination in subtractor circuit 12 of delayed radar signal information with undelayed radar signal information. A delay line and canceler MTI function is therefore performed.

Figure 3:
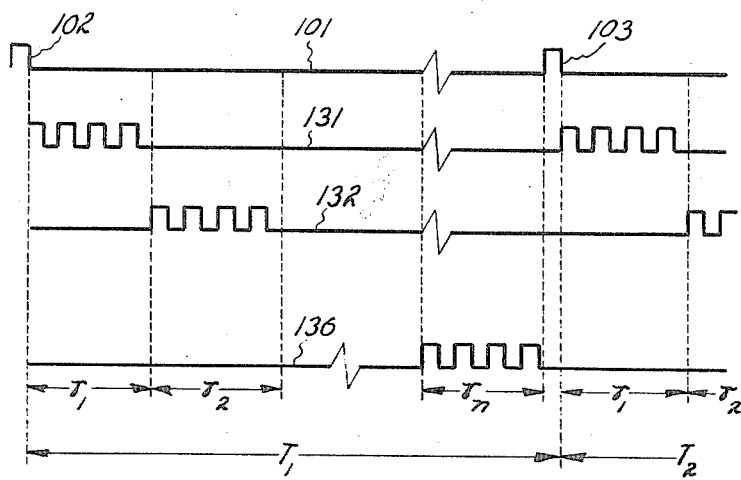
FIG. 3 is a timing diagram showing the time relation between the radar pulse repetition period and the clocking of each charge transfer delay line circuit.

FIG. 3 is a simplified timing diagram which is useful in understanding the operation of the circuit of FIG. 1.

The radar base band 101 defines the radar pulse repetition period T. The first radar pulse repetition interval $T_1$ is the time interval between the first radar pulse 102 and the second radar pulse 103. Line 131 represents the application of clock pulses to the first charge transfer delay line circuit over line 31 of FIG. 1, line 132 represents the application of clock pulses to the second charge transfer delay line circuit over line 32 of FIG. 1, and line 136 represents the application of clock pulses to the Nth charge transfer delay line circuit over line 36 of FIG. 1. At the conclusion of the first radar pulse 102, clock pulses are immediately present on line 131 and continue for the duration of the first subperiod $\tau_1$. During the second subperiod $\tau_2$, clock pulses are present on line 132 and are absent from all other lines. Similarly, during each subperiod one and only one charge transfer delay line circuit is clocked by a number of clock pulses sufficient to precisely fill the delay lines. The last subperiod, $\tau_n$, is characterized by the application of clock pulses shown on line 136 to the last charge transfer delay line. The time position and duration of the train of clock pulses on line 136 is such that subperiod $\tau_n$ terminates immediately prior to the generation of the second radar pulse 103 in the radar base band. Immediately upon the termination of radar pulse 103, clock is reapplied to line 131 for the first subperiod $\tau_1$ of the second radar pulse repetition interval $T_2$. The process described above which occurred during radar period $T_1$ is repeated during radar period $T_2$ and subsequent radar periods with the exception that in radar periods $T_2$ and following periods the application of clock pulses to each charge transfer delay line causes not only the storage in such charge transfer delay lines of radar information present during that radar pulse repetition interval, but also the output from such charge transfer delay lines of the radar information stored during the preceding radar pulse repetition interval.

Figure 2:
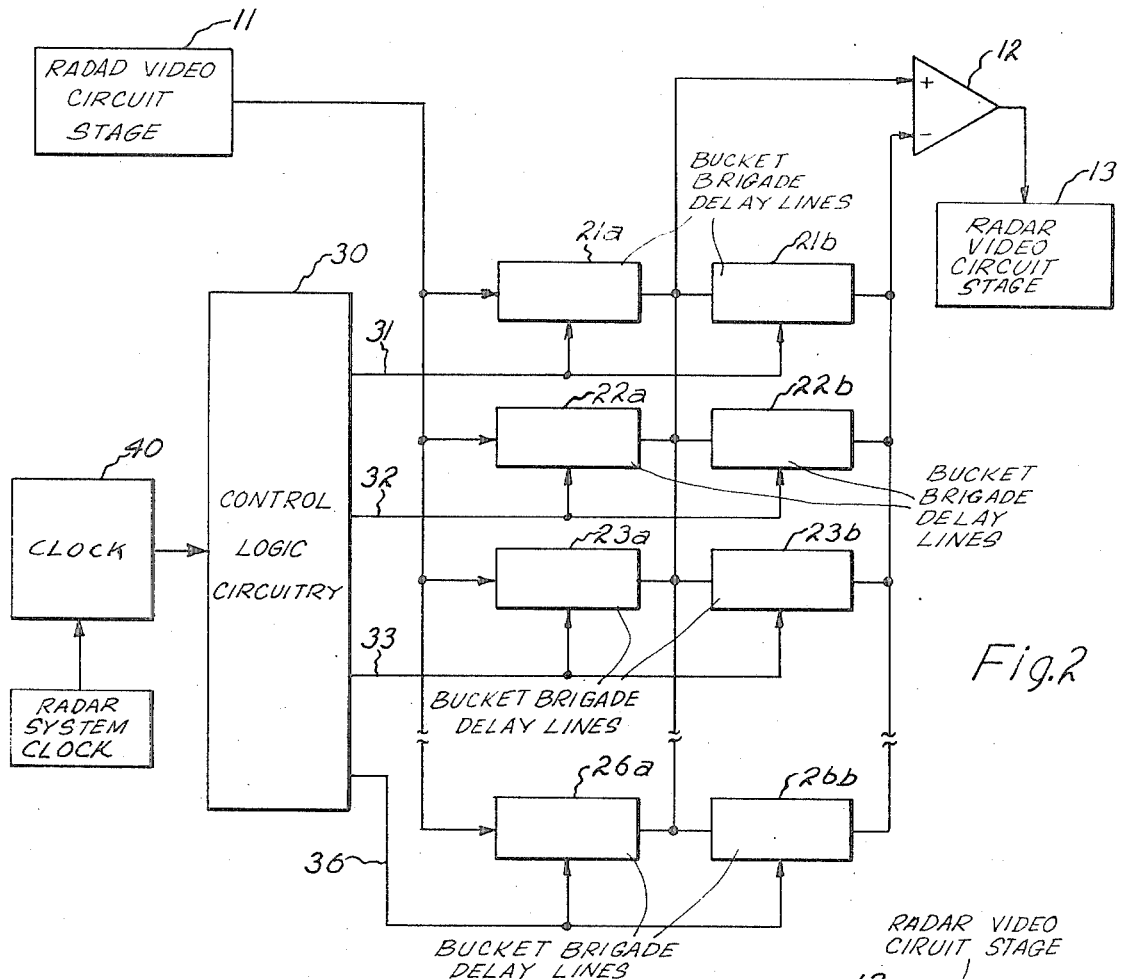
FIG. 2 is a block diagram of a radar MTI circuit in accordance with this invention in which radar signal energy delayed for two radar pulse repetition intervals is compared with radar signal energy delayed for one radar pulse repetition interval.

FIG. 2 is a block diagram illustrating a second embodiment of this invention. In the FIG. 2 embodiment radar video stages 11 and 13, subtractor circuit 12, clock 40, and control logic circuitry 30, are identical to the corresponding elements in FIG. 1. Each of the charge transfer delay lines of FIG. 1 is replaced in the FIG. 2 embodiment by a pair of charge transfer delay lines. Therefore, in operation of the FIG. 2 embodiment, radar information contained in the first subperiod of the first radar pulse repetition interval is clocked into charge transfer delay line 21a, radar information contained in the second subperiod of the first radar pulse information period is clocked into charge transfer delay line 22a and so on as has been discussed. While charge transfer delay lines 21b, 22b, 23b, and 26b are clocked in parallel with charge transfer delay lines 21a, 22a, 23a, and 26a, no information is stored in charge transfer delay lines 21b, 22b, 23b, or 26b during the first radar pulse repetition interval since no information is present at their inputs. During the second radar pulse repetition interval, information contained in the second interval is clocked into the first charge transfer delay lines 21a, 22a, 23a, 26a and information from the first radar pulse repetition interval is clocked out of the first charge transfer delay lines and into the second charge transfer delay lines 21b, 22b, 23b, and 26b. At the conclusion of the second radar pulse repetition interval, therefore, the first charge transfer delay lines 21a, 22a, 23a, and 26a contain the radar information present in the second radar pulse repetition interval and the second charge transfer delay lines 21b, 22b, 23b, and 26b contain radar information contained in the first radar pulse repetition interval. During the third radar pulse repetition interval the first set of charge transfer delay lines stores the information contained in the third radar pulse repetition interval and provides information from the second radar pulse repetition interval to the second set of charge transfer delay lines and to a first input of subtractor circuit 12; simultaneously radar information from the second radar pulse repetition interval is stored in the second set of charge transfer delay lines and radar information from the first radar pulse repetition interval is clocked out of the second set of charge transfer delay lines and is provided to a second input of subtractor circuit 12. The output of subtractor circuit 12, occurring during the third radar pulse repetition interval, is therefore proportional to the difference between the radar information present in the first radar pulse repetition interval and the information present in the second radar pulse repetition interval. Therefore, the output of subtractor circuit 12, which is delivered to a second radar video stage 13, is a radar MTI signal which is delayed by one radar pulse repetition period. The FIG. 2 embodiemtn has the advantage of comparing sampled data with sampled data in subtrator circuit 12. Since both sets of charge transfer delay lines are clocked in parallel by the same clock, the possibility of subtractor circuit 12 including undesired sampling rate information in its output is eliminated.

Figure 5:
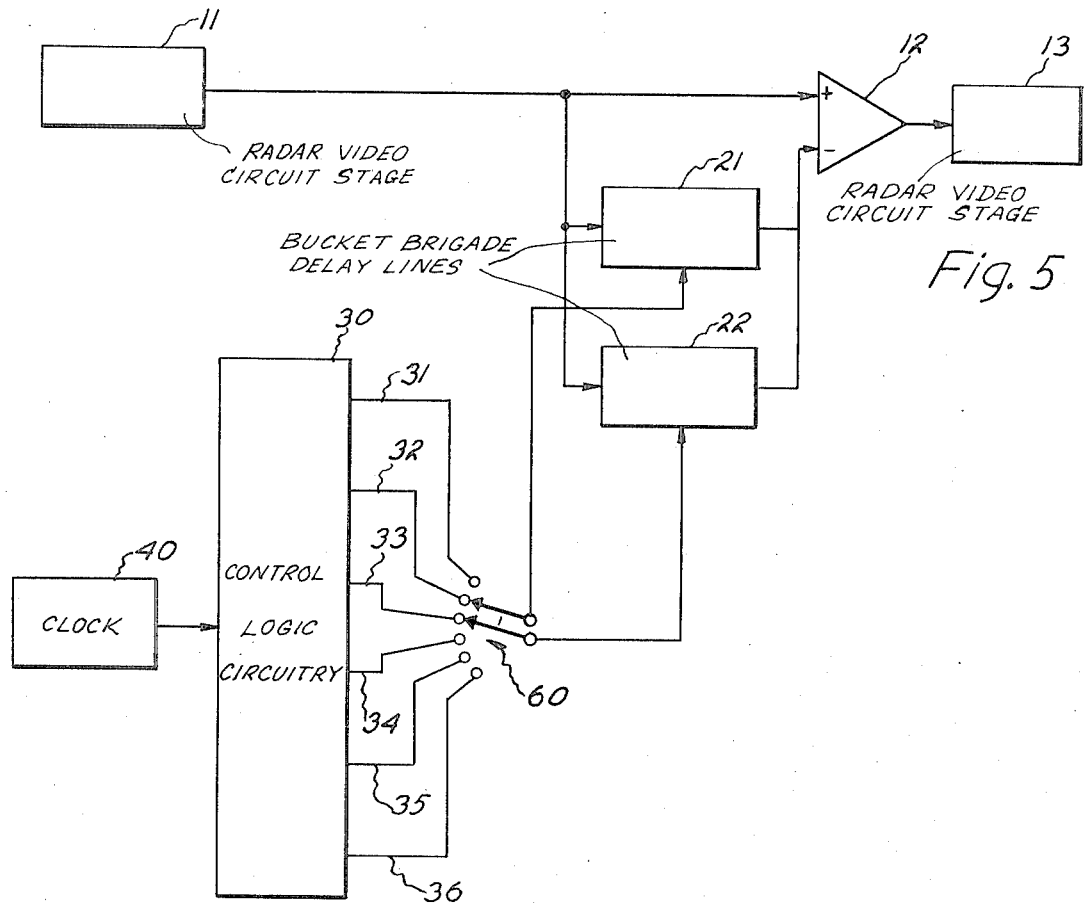
FIG. 5 is a block diagram of a radar MTI circuit in accordance with this invention for providing an MTI "window" within a radar pulse repetition interval.

In some applications, full MTI performance may not be required, but the ability to provide for MTI performance over a portion of the radar pulse repetition interval, i.e., an MTI "window" within the radar pulse repetition interval may be desired. FIG. 5 illustrates an embodiment of this invention which provides for such MTI window. Radar stages 11 and 13, subtractor 12, clock 40, and control logic circuitry 30 are identical to the corresponding elements of FIGS. 1 and 2. Bucket brigade delay lines 21 and 22 are clocked by any two consecutive control lines selected from control lines 31–36 by switch 60. Thus, bucket brigades 21 and 22 provide a $2\tau$ MTI window within the radar pulse repetition interval. The radar operator may select the position of the MTI window within the pulse repetition interval by adjustment of switch 60. FIG. 5 illustrates a $2\tau$ window using two bucket brigade delay lines and a double pole switch. It will be immediately apparent to those skilled in the art that the width of the window may be any integral multiple of $\tau$, and that one bucket brigade delay line and one pole of switch 60 is required for each $\tau$ width of the window desired. It should also be apparent to those skilled in the art that the winow selecting function may be performed within control logic circuitry 30 under external program control and that the electromechanical selection among a plurality of lines by means of switch 60 is but one example of means for positioning the MTI window within the radar pulse repetition interval.

Control logic circuitry 30 of FIGS. 1, 2, and 5 is essentially a commutator. The design of a variety of commutators is within the purview of those skilled in the art. As an illustrative example, therefore, and not by way of limitation, commutator 30 may be constructed by connecting to the output of clock 40 a divider circuit, such as a ring counter, which will provide an output for every Kth clock pulse where K is the number of stages in each bucket brigade delay line; the output of the divider circuit is provided to a four-bit counter such as a four-bit counter Model SN-74163, manufactured by Texas Instruments which in turn drives a 1–16 demultiplexer Model SN-74154 also manufactured by Texas Instruments. If a clock input is provided to the demultiplexer, that clock signal will appear sequentially on each of the 16 output lines of the 1–16 demultiplexer. K clock pulses will be supplied on the first output line of the demultiplexer, and then the ring counter will provide an output pulse causing a change in the output of the four-bit counter which will then cause the output of the demultiplexer to be present on its second output line, and the second K clock pulses will be present on the second output line of the demultiplexer. Similarly, each K clock pulse produces one output pulse from the ring counter which causes the output of the four-bit counter to change, which in turn steps the output of the demultiplexer to the next following line.

Figure 6:
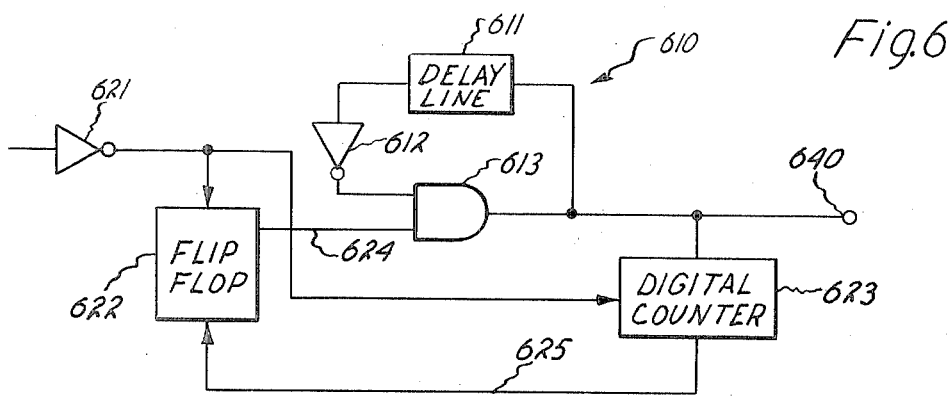
FIG. 6 is a logic diagram of a clock for use in the circuits of FIGS. 1, 2, and 5.

Clock 40 of FIGS. 1, 2, and 5 may be a stable square wave generator or any other suitable clock, but is preferably synchronized to the radar base band. If the radar system in which the MTI circuit of this invention is to be used includes a system clock, as almost all radar systems of contemporary design do, the MTI clock may be derived from the radar system clock as illustrated in FIG. 2 by means well known in the art. If, on the other hand, the radar system does not have a master clock, an unsynchronized clock could be used, but preferably a synchronized clock constructed in accordance with FIG. 6 should be employed. In FIG. 6 the clock oscillator circuit is shown generally at 610 and comprises delay line 611, inverter 612, and AND gate 613. The remaining elements shown in FIG. 6 constitute the clock synchronizing circuitry. At the start of a radar pulse repetition period, radar trigger is provided to inverter 621 whose output sets flip-flop 622 and clears digital counter 623. When flip-flop 622 is set, it provides a logic one on line 624 to AND gate 613. AND gate 613 therefore provides a logic one output since inverter 612 provides a logic one output to AND gate 613 in the absence of a logic one at the inverter input. The output of AND gate 613 is provided to clock output terminal 640, digital counter 623, and delay line 611. After the delay time of delay line 611, a logic one appears at the input of inverter 612 and a logic zero is therefore provided from inverter 612 to AND gate 613. At this point, the output of an AND gate 613 is logic zero and clock output at terminal 640 is low. When the logic zero has propagated through delay line 611, inverter 612 again applies logic one to the input of AND gate 613, logic one again appears at the output of AND gate 613 and the clock signal at terminal 640 is high. Logic one again propagates through delay line 611 and inverter 612 turns off AND gate 613. The immediately foregoing describes the generation of the first two clock pulses by clock 40 of FIGS. 1 and 5. Digital counter 623 is designed to count the total number of clock pulses desired in each radar pulse repetition interval, that is, the product of the number of stages K in each bucket brigade delay line and the number N of bucket brigade delay lines in the MTI system. When digital counter 623 has counted NK clock pulses, it provides an output pulse on line 625 which resets flip-flop 622. Flip-flop 622 therefore provides a logic zero output on line 624 to AND gate 613 which inhibits oscillator 610. The above described process is repeated when the next radar system trigger is applied to inverter 621.

Figure 4:
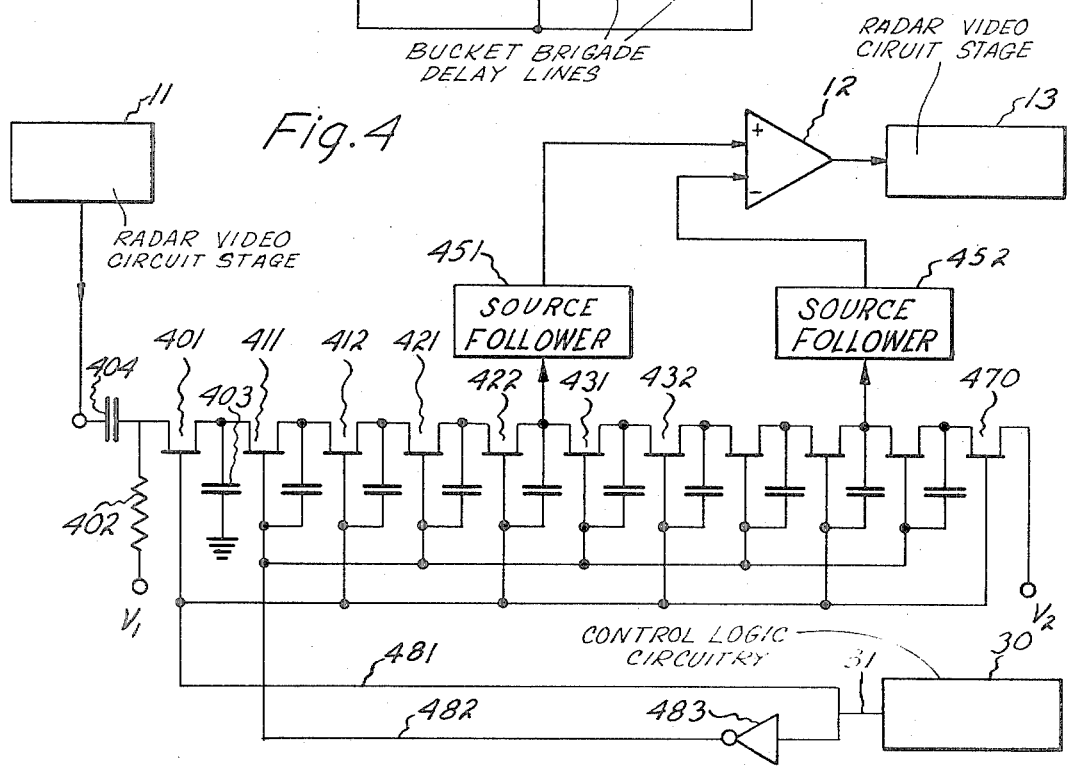
FIG. 4 is an electrical schematic diagram of one charge transfer delay line pair of FIG. 2.

FIG. 4 shows one charge transfer delay line pair of FIG. 2 in electrical schematic form with its interconnections to control logic circuitry 30, radar stages 11 and 13, and subtractor circuit 12 elements of FIG. 2. The source electrode of a first field effect transistor 401 is connected to the output of radar stage 11 through d-c de-coupling capacitor 404, and through resistor 402 to a first bias potential $V_1$. The drain electrode of FET 401 is connected to a grounded capacitor 403. The gate electrode of FET 401 is connected to conductor 481 which conducts clock signals from control logic circuitry 30. FET 401, capacitor 403, capacitor 404, and resistor 402 comprise a sampling circuit which samples the output of radar stage 11 under control of clock signals and constitutes an input stage to the analog charge transfer delay line. The delay line comprises a plurality of serially connected delay line stages, each delay line stage comprising two serially connected FET's and a capacitor connected between the drain and gate electrodes of each FET. Thus, FET's 411 and 412 comprise the first delay line stage, FET's 421 and 422 comprise the second delay line stage, etc. The gate electrode of the first FET of each delay line stage (411, 421, etc.) is connected to line 482 and is supplied thereby with inverted clock signals from inverter 483. The gate electrodes of the second FET of each delay line stage is connected to line 481 which supplies noninverted clock. Each delay line of the delay line pair shown has the output of its last stage connected to a source-follower circuit shown as 451 and 452, respectively, for isolation. The outputs of source-follower circuits 451 and 452 are delivered to subtractor circuit 12. As FIG. 4 shows, it is most convenient to construct each charge transfer delay line pair by fabricating a double length charge transfer delay line and center-tapping it. The last capacitor of the delay line is charged to the reference value $V_2$ through FET 470 whose channel is connected between the last capacitor and bias potential $V_2$. Precharging of the last capacitor is controlled by the connection of the gate electrode of FET 470 to noninverted clock line 481.

While this invention has been described with reference to particular embodiments, other modifications and variations will occur to those skilled in the art in view of the above teachings. Accordingly, it should be understood that within the scope of the appended claims the invention may be practiced otherwise than is specifically described.

The invention claimed is:

1. In a radar system including a receiver having a video signal path, the improvement which comprises:
   a. at least one charge transfer delay line circuit having
      means for receiving input signals from said video signal path,
      means for providing output signals, and
      means for receiving control energy;
   b. time base generating means for providing said control energy;
   c. first commutation means connected between said time base generating means and said means for receiving control energy for sequencing the control of said charge transfer delay line circuits by said time base generating means; and d. means connected to said means for providing output signals for comparing said output signals with a reference and providing an output indicative of the difference between said output signals and said reference, said output indicative of the difference being provided to said video signal path.

2. The improvement claimed in claim 1 wherein said radar system includes a system clock and said time base generating means is driven by said system clock.

3. The improvement claimed in claim 1 wherein said time base generating means comprises:
   a. an oscillator;
   b. a counter for receiving an output of said oscillator, said counter providing an output pulse when a preselected number of oscillations have been received; and
   c. pulse responsive means for turning said oscillator on and off, said pulse receiving means turning said oscillator on in response to a trigger pulse provided by said radar system and turning said oscillator off in response to said output pulse provided by said counter.

4. The improvement of claim 3 wherein:
said oscillator comprises an AND gate having first and second input means and one output means, and a delay line, said delay line being connected between said output means and said first input means; and
said pulse responsive means is connected to said second input means.

5. The improvement claimed in claim 1 wherein there are a plurality of said charge transfer delay lines each said charge transfer delay line having a delay time $\tau$, and wherein said first commutation means connects said time base generating means to said means for receiving control energy of each said charge transfer delay line for a period of duration $\tau$.

6. The improvement of claim 5 wherein said radar system has a pulse repetition interval equal to $N\tau$ in duration, and there are N said charge transfer delay lines.

7. The improvement of claim 5 wherein said first commutation means has a plurality of output lines and including additionally second commutation means interposed between sid first commutation means and said means for receiving control energy for selecting from among said output lines a subset thereof, the output lines included in said selected subset being effective in said sequencing.

8. The improvement claimed in claim 1 wherein said reference is a video signal taken from said video signal path electrically in parallel with said means for receiving input signals.

9. The improvement claimed in claim 1 wherein each said charge transfer delay line is tapped at its center to provide second means for providing output signals, said reference being taken from said second mens for providing output signals.

10. The improvement of claim 9 wherein there are N said charge transfer delay lines, each said charge transfer delay line having a delay time $2\tau$, and wherein said first commutation means connects said time base generating means to said means for receiving control energy of each said charge transfer delay for a period of duration $\tau$, said radar system having a pulse repetition interval equal to $N\tau$ in duration.

* * * * *